(12) United States Patent
Sanoner et al.

(10) Patent No.: US 6,864,462 B2
(45) Date of Patent: Mar. 8, 2005

(54) ELECTRONIC DRINKING MUG

(75) Inventors: Hughes Sanoner, Hong Kong (CN); Jacob Rothman, Stockton, CA (US)

(73) Assignee: Solar Wide Industrial, Ltd. (CN)

( * ) Notice: Subject to any disclaimer, the term of this patent is extended or adjusted under 35 U.S.C. 154(b) by 2 days.

(21) Appl. No.: 09/865,920

(22) Filed: May 25, 2001

(65) Prior Publication Data

US 2002/0175158 A1 Nov. 28, 2002

(51) Int. Cl.$^7$ .............................. H05B 1/02; A47J 36/26
(52) U.S. Cl. ........................ 219/387; 219/438; 219/442
(58) Field of Search ................................ 219/386, 387, 219/429, 432, 433, 435, 438–442; 374/150, 157

(56) References Cited

U.S. PATENT DOCUMENTS

| | | | | |
|---|---|---|---|---|
| 3,931,494 A | * | 1/1976 | Fisher et al. ................ 219/441 |
| 4,095,090 A | * | 6/1978 | Pianezza ..................... 219/441 |
| 4,442,343 A | * | 4/1984 | Genuit et al. ............... 219/433 |
| 4,801,782 A | * | 1/1989 | Ineson ........................ 219/438 |
| 5,042,258 A | * | 8/1991 | Sundhar ....................... 62/3.2 |
| 5,208,896 A | * | 5/1993 | Katayev ..................... 219/432 |
| 5,243,684 A | | 9/1993 | Edwards ..................... 392/444 |
| 5,283,420 A | | 2/1994 | Montalto .................... 219/432 |
| 5,508,494 A | | 4/1996 | Sarris et al. ................ 219/386 |
| 5,678,925 A | * | 10/1997 | Garmaise et al. ........... 374/157 |
| 5,842,353 A | * | 12/1998 | Kuo-Liang ................. 219/432 |
| 5,903,133 A | | 5/1999 | Amero, Jr. et al. ......... 320/107 |
| 6,075,229 A | * | 6/2000 | Vanselow ................... 219/432 |
| 6,140,614 A | | 10/2000 | Padamsee ................... 219/438 |

FOREIGN PATENT DOCUMENTS

| | | | |
|---|---|---|---|
| DE | 19744526 | * | 4/1997 |
| FR | 2737380 | * | 1/1997 |

* cited by examiner

Primary Examiner—Joseph Pelham
(74) Attorney, Agent, or Firm—Lerner, David, Littenberg, Krumholz & Mentlik, LLP

(57) ABSTRACT

An electronic drinking mug includes a heating element in thermal communication with the mug for heating a liquid contained in the mug, a temperture sensoring in communication with the heating element for monitoring a temperature of the liquid, a controller integrally attached to an outer surface of the mug and in communication with the temperature sensor and the heating element for selectively activating and deactivating the heating element so as to heat the liquid in the mug to a desired temperature. In operation, the controller receives temperature readings from the temperature sensor and deactivates the heating element when the monitored temperature of the liquid is greater than or equal to the desired user preset temperature of the liquid. A user interface is integrally attached to the outer surface of the mug and in communication with the controller for establishing the desired temperature of the liquid.

32 Claims, 9 Drawing Sheets

ELECTRONIC DRINKING MUG

BACKGROUND OF THE INVENTION

The present invention is generally related to beverage containers and is particularly directed to electronic drinking mugs for heating liquids to selected temperatures as well as to monitor the temperature of the liquid.

Individuals frequently drink soda, tea, water or coffee when traveling in automobiles. In order to facilitate this activity, automobile manufacturers have designed a wide variety of cup holders for securing beverage containers adjacent vehicle occupants. Some of these beverage containers are insulated for maintaining the temperature of a beverage. Unfortunately, insulated beverage containers cannot maintain the temperature of a beverage over a long period of time. This is particularly true of hot beverages, such as coffee and tea. As a result, a wide variety of heated cups and cup warmers have been developed. These heated devices typically have an electrical plug that is inserted into a cigarette lighter for providing power to the device.

U.S. Pat. No. 5,508,494 to Sarris et al. discloses a portable beverage cup made of thermally and electrically insulated material, such as injection molded plastic having a low-melting point. The beverage cup includes a heating element that warms the beverage and a retractable power cord that passes through an aperture in the container shell and is wound around the outer surface of the container in a helical manner.

U.S. Pat. No. 5,283,420 to Montal to discloses an electrically heated beverage container and holding stand for maintaining a heated beverage at a suitable drinking temperature. The beverage container includes a thin metallic cup-shaped insert having a positive temperature coefficient (PCT) ceramic heater affixed to a bottom wall thereof. An electrically non-conductive plastic sleeve encapsulates the insert and ceramic heater. The plastic sleeve has a film-like inner shell that promotes rapid heat transfer from the metal insert to the beverage in the container. A pair of electrical contact pins extend into a linear groove on the bottom of the container for mating with spring contacts located between a pair of linear guides at the top of the holding stand. When the container is mounted on the stand, an upstanding tab on the stand engages a recess in the container to positively restrain the container.

U.S. Pat. No. 5,243,684 to Edwards discloses a portable electrically heated container for liquids having a heating element secured to the bottom of the container by a support bar having its ends frictionally inserted into support slots. The bottom of the container is enclosed by a base cap separable from the container for providing access to the heating element. The heated container includes a power connection within the separable base cap and an indicating light to show a power-on condition.

U.S. Pat. No. 5,903,133 to Amero, Jr. et al. discloses a beverage holder and charger for use in a vehicle. The charger has a base that fits within an automobile beverage holder, an element for securing the base of the beverage holder, a first electrical contact on the base to supply power to the charger, a second electrical contact on the base to supply power to the item to be charged, and a receptacle on the base for holding the item to be charged.

U.S. Pat. No. 6,140,614 to Padamsee discloses an electric drinking cup for use while driving a vehicle. The electric drinking cup includes a plastic inner liner, a metal outer shell, and an insulation-filled space therebetween. A heating element is associated with the bottom portion of the inner liner, and is electrically connected to a vehicle's electrical system. The plastic inner liner curves around the upper edge of the outer metal shell providing a cup lip that does not get too hot when the cup contains a liquid. The combination of the plastic inner shell and the heating element provides a diffuse heat that heats liquid, such as coffee or hot chocolate, slowly to the desired temperature so that the liquid does not burn and become distasteful.

Despite these and other improvements in the art, still further improvements are needed in the field of heatable drinking mugs.

SUMMARY OF THE INVENTION

In accordance with certain preferred embodiments of the present invention, an electronic drinking mug includes a heating element in thermal communication with the mug for heating a liquid contained in the mug, such as coffee or tea. The electronic drinking mug includes a temperature sensor for monitoring a temperature of the liquid, and a controller in communication with the heating element for selectively activating and deactivating the heating element so as to heat the liquid in the mug to a desired temperature. The controller may include a microprocessor, a chip package or a printed circuit board with one or more chips secured thereto. The controller preferably continuously receives temperature signals from the temperature sensor and deactivates the heating element when the monitored temperature of the liquid is greater than or equal to the desired temperature of the liquid. The electronic drinking mug also desirably includes a user interface attached to the mug that is in communication with the controller for enabling a user to establish the desired temperature of the liquid.

The electronic drinking mug of the present invention preferably has at least two functions. In an automatic function or mode, the electronic drinking mug displays the temperature of the liquid contained therein on a visual display. The temperature of the liquid may also be displayed on a light emitting diode (LED) panel. The light emitting diode panel preferably has at least four temperature level indicators including very hot, hot, lukewarm, and room temperature. In the automatic mode, the heater element is preferably initially deactivated and the over icon is activated when the temperature of the liquid in the mug is measured at a temperature of greater than or equal to 176° F. In a set mode, the user presets a desired temperature for the beverage. After the desired temperature has been set, the visual display illuminates a "set" icon and the microcontroller monitors the temperature of the liquid, alerts a user of the measured temperature, and selectively activates the heater when necessary so as to heat the liquid to the desired temperature and/or maintain the liquid within a range at or close to the desired temperature.

In certain preferred embodiments, the user interface includes a visual display in signal sending and receiving relation with the controller for displaying the monitored temperature of the liquid, or for showing a final desired temperature established for the liquid by a user of the mug. The visual display may include a liquid crystal display having a region for showing the monitored or selected temperature of the liquid, as well as an indicator displaying when the liquid is ready to drink or has been heated above a desired temperature. The visual display may also include a series of lights, whereby each light is associated with a particular temperature level selected from the group consisting of room temperature, lukewarm, hot, and very hot.

The series of lights may form a bar-graph of light emitting diodes (LEDs). As a temperature level is reached, the LED associated with the temperature level will illuminate, while the remaining LED's in the series remain in an unilluminated state.

The electronic drinking mug of the present invention may also include a sound generating element, such as an electronic buzzer, in signal sending and receiving relation with the controller for selectively generating an audible sound. In certain preferred embodiments, the sound generating element is activated when the temperature selected by a user has been attained. In other preferred embodiments, the sound generating element may be activated when the monitored temperature exceeds the selected temperature or when the liquid has been heated to a dangerously high level. In one preferred embodiment, the sound generating element generates a single "beep" when the temperature selected by a user has been attained. In other preferred embodiments, the sound generating element continuously generates a continuous "Bi—Bi—Bi" sound when the monitored temperature of the liquid exceeds a dangerously high temperature. The sound generating element may also be activated each time a button on the controller is pressed to provide an indication that a selection r action has been made.

In certain preferred embodiments, the controller includes a logic subroutine that deactivates the heating element when the monitored temperature is greater than or equal to the selected or desired temperature. After the user selected temperature has been reached, the heating element will be deactivated and will remain in an unactive state until the monitored temperature falls at least 2° F. below the desired temperature. At such point, the logic subroutine will once again activate the heating element to further heat the liquid and maintain the liquid within a desired temperature window. The heating element will once again be deactivated when the monitored temperature is greater than or equal to the selected temperature. The exact temperature ranges for activating and deactivating the heating element may vary in response to user preferences and/or user selection, or the type of liquid being heated. The exact temperature ranges may also vary in response to information programmed into the controller.

In certain preferred embodiments, the electronic drinking mug includes one or more electrical connectors for providing power to the heating element, the controller, and/or the user interface. In certain preferred embodiments, the electrical connector is formed in the outer mug and projects from the outer mug. The electrical connectors may also be provided at an underside of the mug in the form of a male or female connectors. In other preferred embodiments, the electrical connector may include a male or female connector attached to an end of a power cord.

In still other preferred embodiments, the controller includes an overheat protection logic subroutine stored therein for deactivating the heating element when the monitored temperature exceeds the predetermined overheat temperature. In one particular preferred embodiment, any temperature that exceeds 176° F. is considered to be dangerously high. As a result, the controller will deactivate the heating element upon monitoring such a temperature and may also activate either the visual display or the audible element or both so as to notify a user that the liquid has been heated to a dangerously high level.

In certain preferred embodiments, the electronic drinking mug includes an inner mug insertable into an outer mug. The inner mug may be selectively removed from the outer mug for cleaning and/or replacement. The inner and outer mugs may be made of a sturdy material such as plastic. The outer mug may include one or more anchor points for securing a handle, such as a plastic handle, to an outer surface of the outer mug. The electronic drinking mug may also include the heating element including heating coils for generating heat, the heat being transferred to the liquid stored in the mug. The heating element may be secured to a lower end of the inner mug and may be disposed or sandwiched between the inner and outer mugs during assembly. The mug also preferably includes a thermostat for regulating the amount of heat produced by the heating coils so as to prevent melting of the inner mug which is typically made of plastic.

The upper end of the mug preferably includes an opening for receiving liquid. The upper end of the mug is preferably adapted to receive a detachable lid that selectively covers the mug opening. The lid may include a sealing ring, such as a rubber ring secured within an annular grove at an underside of the lid, for forming a thermal seal between the inner mug and the lid. The lid may also preferably include an elongated slot for enabling liquid to pass therethrough, as well as an air escape hole for minimizing the likelihood of a vacuum forming within the mug during use.

The controller may include at least one temperature set key in signal sending relation with the controller. The temperature set key is preferably depressible one or more times for activating the electronic drinking mug and/or for establishing a final desired temperature to which the liquid is to be heated. In one preferred embodiment, the selected temperature is elevated one degree each time the set key is depressed. The set key may also be maintained in a depressed position for two or more seconds and held in the pressed position for more rapidly elevating the desired temperature. In this rapid set mode, upon releasing the set key, the controller will establish the latest temperature appearing on the visual display as the set or desired temperature and activate the heating element until the monitored temperature is greater than or equal to the selected temperature. In certain preferred embodiments, after setting the temperature once, a user may select a new temperature to which the liquid is to be heated. Upon reaching the new temperature level, the controller will preferably activate the electronic buzzer to produce a "Bi—Bi—Bi" sound indicating that the new temperature level has been attained.

In certain preferred embodiments of the present invention, a method of maintaining a liquid at a selected temperature includes providing a drinking mug and a heating element in thermal communication with the mug, providing a temperature sensor in communication with the heating element for continuously monitoring a temperature of a liquid in the mug, selecting a desired temperature for the liquid, and heating the liquid to the selected temperature. The method also desirably includes deactivating the heating element after the heating step when the monitored temperature is greater than or equal to the desired temperature. The method may also include the step of reactivating the heating element after the deactivating step when the monitored temperature is less than the desired temperature. In one particular preferred embodiment, the heating element is deactivated once the desired temperature is attained, however, after the desired temperature has been initially attained the heating element is reactivated when the monitored temperature falls 2° F. or more below the desired temperature. This deactivation and reactivation process may be continuously repeated numerous times for maintaining the liquid within the desired temperature range.

These and other preferred embodiments of the present invention will be described in more detail below.

DETAILED DESCRIPTION

Figure 1:
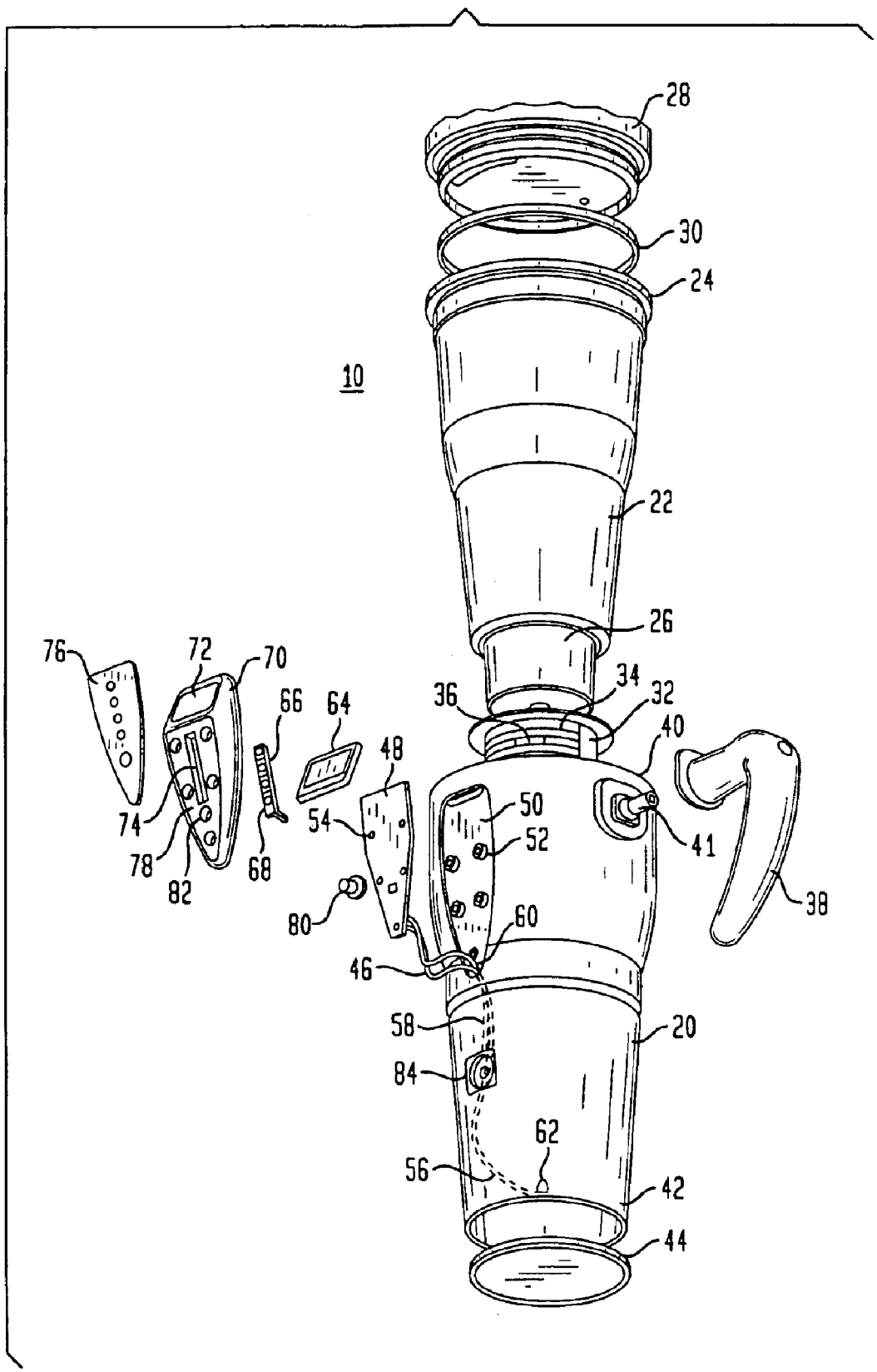
FIG. 1 shows an exploded view of an electronic drinking mug, in accordance with certain preferred embodiments of the present invention.

Referring to FIG. 1, in accordance with certain preferred embodiments of the present invention, an electronic drinking mug 10 includes an outer mug 20 and an inner mug 22 insertable in the outer mug 20. Inner mug 22 includes an upper end 24 having a central opening (not shown) and a lower end 26 remote therefrom. Inner mug 22 may be removed from outer mug 20 for cleaning and/or replacing inner mug 22. Electronic drinking mug 10 also desirably includes a top cover or lid 28 having rubber ring 30 securable to an underside thereof for forming a seal when lid 28 is affixed atop the opening at upper end 24 of inner mug 22.

Electronic drinking mug 10 also includes a heating element 32 adapted to be affixed to lower end 26 of inner mug 22. Heating coils 34 are preferably wrapped around heating element 32 for generating heat upon running electric current therethrough. Heating element 32 also preferably includes a thermostat 36 connected thereto for regulating the temperature of the heating coils. The thermostat 36 preferably serves as a heat regulator and safety device for deactivating the heating element 32 in case of a malfunction of a controller, described in more detail below, or in case no liquid is in the mug while the mug remains electrically interconnected with a power source, such as a cigarette lighter. In addition, the thermostat 36 preferably protects the electronic drinking mug from over-heating, which may result in the plastic portion of the mug melting and permanently deforming.

Electronic drinking mug 10 may have a handle 38. In one preferred embodiment, the handle 38 is secured adjacent an upper end 40 of outer mug. In this particular preferred embodiment, outer mug 20 has a male-end projection 41 that fits within a female opening (not shown) of handle 38 for affixing the handle 38 to the mug 10. A lower end 42 of outer mug 20 may be covered by a bottom plate 44 preferably made of a non-slidable material such as rubber. In other words, the bottom plate is preferably made of a material that prevents the mug from sliding when positioned atop a surface.

Electronic drinking mug 10 also preferably includes a controller 46 for selecting a desired temperature to which a liquid stored within mug 10 is to be heated. The controller 46 may also be used for monitoring and controlling the temperature of the liquid during operation of the mug. Controller 46 includes a printed circuit board 48 that may be affixed to a recess 50 formed on the exterior surface of outer mug 20. The printed circuit board may have microelectronic devices secured thereto such as semiconductor chips, semiconductor packages and memory devices. Recess 50 desirably includes a series of anchor points 52 adapted to receive securing elements, such as screws. In one preferred embodiment, printed circuit board 48 includes apertures 54 that are aligned with anchor points 52 of the printed circuit board 48, whereby threaded screws are passed through apertures 54 and screwed into anchor points 52 for securing printed circuit board 48 to recess 50.

Printed circuit board 48 desirably includes a series of conductive wires 56, 58 extending therefrom. A first conductive wire 56 extends from printed circuit board 48, through an aperture 60 at a lower end of recess 50, to a temperature sensor 62 provided inside outer mug 20. The temperature sensor 62 continuously monitors the temperature of the liquid for obtaining temperature readings of the liquid contained within mug 10. The temperature readings obtained by temperature sensor 62 are continuously transmitted to printed circuit board 48 for evaluation by controller 46, as will be described in more detail below. A second conductive wire 58 extending from printed circuit board 48 is electrically connected with a sound generating device 84, such as an electrical buzzer, exposed at an outer surface of outer mug 20. As will be described in more detail below, printed circuit board 48 may send an electrical signal to buzzer 84 so as to generate one or more audible sounds during operation of electronic drinking mug 10.

Figure 2:
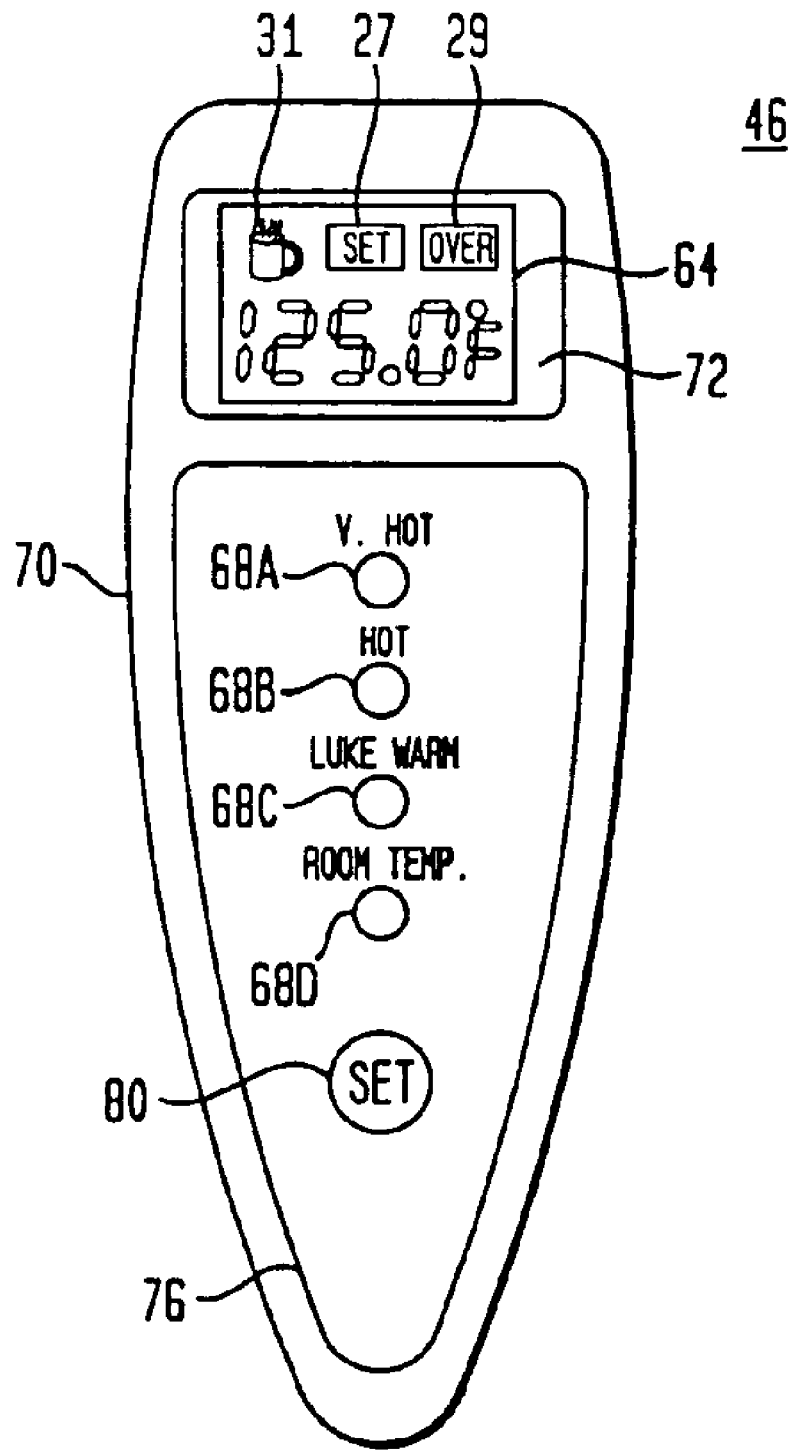
FIG. 2 shows a front elevational view of a controller for the electronic drinking mug of FIG. 1.

Referring to FIGS. 1 and 2, controller 46 also includes a visual display 64, such as a liquid crystal display, and a panel 66 having a series of light emitting diodes 68A–68D. A bracket 70 including a transparent window 72 is provided over the visual display 64, the light emitting diode panel 66 and the printed circuit board 48 to reliably secure the elements of the controller 46 within the recess 50 of outer mug 20. During assembly of controller, visual display 64 is substantially aligned with transparent window 72 and LED panel 66 is aligned with slot 74 of bracket 70. A mask 76, such as an aluminum mask, may be provided over a front panel 78 of bracket 70.

Controller 46 may also include a depressible set key 80 in signal sending relation with printed circuit board 48. Depressible set key 80 preferably includes an exterior surface covered by rubber. During assembly of controller 46 to outer mug 20, at least a portion of depressible set key 80 passes through a key opening 82 formed in bracket 70.

Referring to FIG. 2, visual display 64 is preferably a liquid crystal display including a temperature display region 25 that indicates either the selected temperature or the latest sensed temperature reading of the liquid within the mug. Liquid crystal display 64 also includes a set indicator 27 that indicates that a user has selected a final desired temperature, and an over indicator 29 that illuminates or is activated when the sensed temperature is at a dangerously high level. Liquid crystal display 64 also includes a heater on indicator 31, such as a flashing image of a coffee icon, that is activated when the liquid in the mug is in the process of being heated to the desired temperature selected by a user. The temperature information displayed in temperature display region 25 of liquid crystal display 64 may be presented in either Fahrenheit or Celsius. The electronic drinking mug may include a switch for changing the temperature reading from Fahrenheit to Celsius and visa versa.

Figure 3:
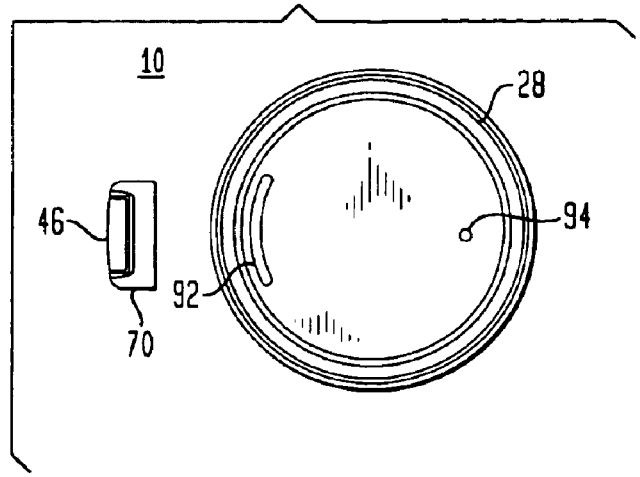
FIG. 3 shows a partially exploded top plan view of the electronic drinking mug of FIG. 1.

FIG. 3 shows a top plan view of the electronic drinking mug 10 of FIG. 1 including lid 28. The lid 28 includes a slot 92 for enabling liquid contained within mug 10 to pass therethrough. Lid 28 also includes an air pass through aperture 94 for minimizing the likelihood of a vacuum forming within inner mug 22.

Figure 4:
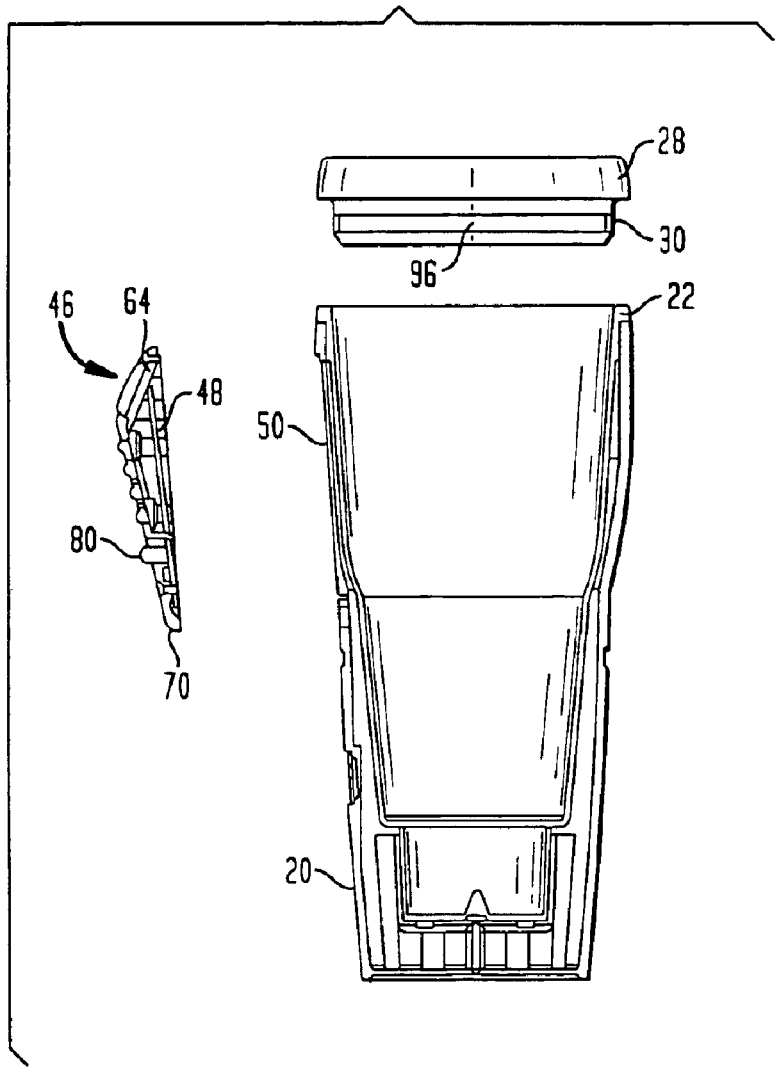
FIG. 4 shows a side elevational view of the electronic drinking mug of FIG. 3.

FIG. 4 shows a side elevational view of electronic drinking mug 10 including lid 28 having a sealing ring 30 secured within a recess 96 thereof. Sealing ring 30 forms an air-tight seal between inner surface of inner mug 22 and underside of lid 28 when lid is secured atop mug 10. Controller 46, including printed circuit board 48, visible display 64 and bracket 70, is secured to recess 50 formed at the outer surface of outer mug 20. Depressible set key 80 extends from outer surface of outer mug 20 and is electrically interconnected with printed circuit board 48. Depressible set key 80 may be depressed one or more times for activating electronic drinking mug and selecting a final desired temperature for heating liquid stored within mug 10.

Figure 5:
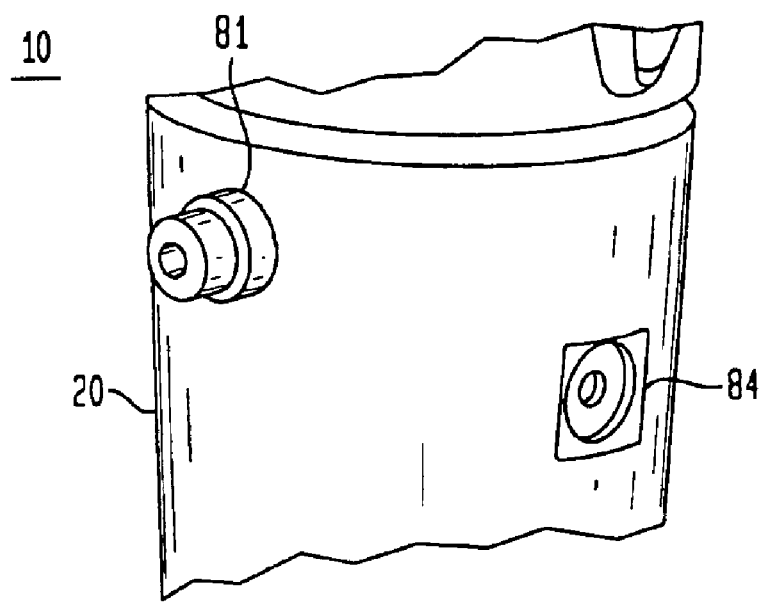
FIG. 5 shows a fragmentary view of the electronic drinking mug of FIG. 1.
Figure 6:
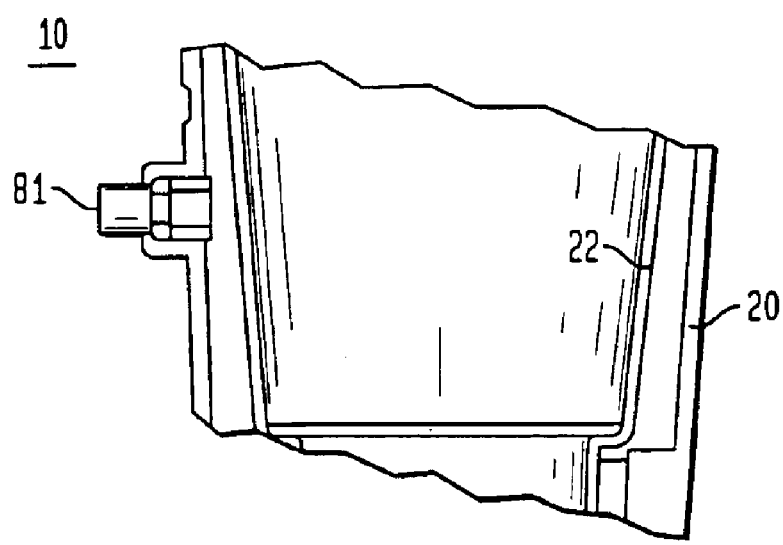
FIG. 6 shows a fragmentary cross-sectional view of the electronic drinking mug of FIG. 5

FIG. 5 shows a fragmentary view of outer mug 20 of FIG. 1 including a direct current (DC) connector 81 adapted to be connected with a power cord for providing power to the printed circuit board and/or other components of the electronic drinking mug. Mug 10 also includes buzzer 84 that is activated by signals received from the controller (not shown). In certain preferred embodiments, buzzer 84 is activated to generate an audible sound when a desired temperature for the liquid contained in mug 10 has been attained, or when the temperature of the liquid exceeds a safe drinking temperature. In certain preferred embodiments, the buzzer 84 will continuously generate an audible sound as long as the monitored temperature exceeds the safe drinking temperature. FIG. 6 shows a cross-sectional view of the mug 10 of FIG. 5, including inner mug 22, outer mug 20 and DC connector 81 projecting from outer mug 20.

Figure 7A:
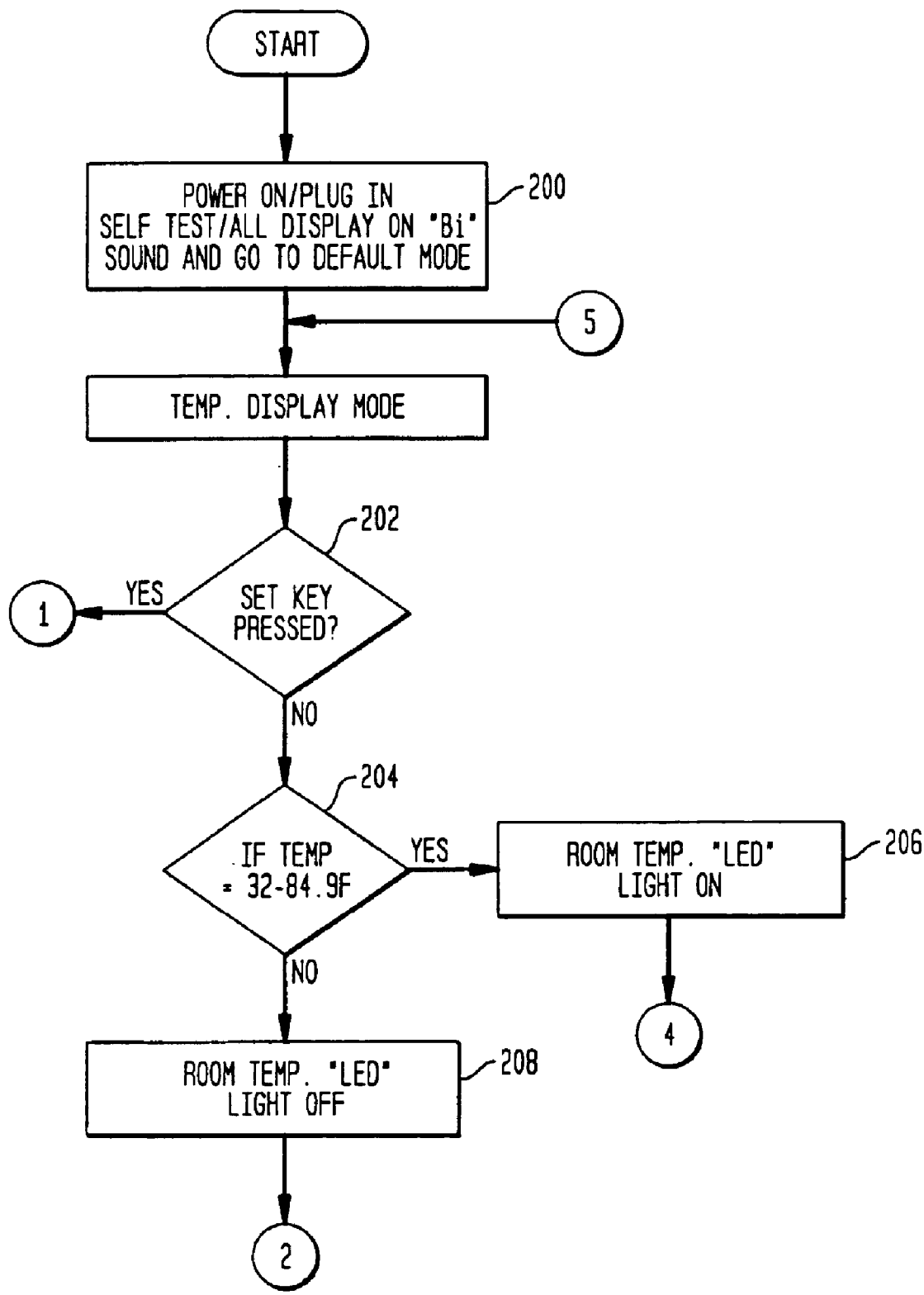
FIGS. 7A–7E show logic routines for operation of an electronic drinking mug, in accordance with certain preferred embodiments of the present invention.

Referring to FIGS. 1 and 7A, in operation, a user provides power to electronic drinking mug at step 200 such as by inserting a male end plug into DC connector at the outer surface of the mug 10 (FIG. 5). Power is preferably automatically turned on when a first end of a DC power cord is inserted into a power source such as a cigarette lighter and a second end is inserted into the DC connector on the mug. The electronic drinking mug of the present invention may also be powered using energy cells such as batteries and solar cells. Upon activating electronic drinking mug, the liquid crystal display 64 will indicate whether the user has pre-set a final desired temperature at which the heating element should be deactivated. If controller 46 determines that the set key 80 has not been pressed at step 202, the temperature sensor 62 monitors the temperature of the liquid within mug 10. At step 204, if the monitored temperature is between 32–84.9° F., a "room temperature" LED is illuminated on LED panel 68 at step 206. If the monitored temperature is not within the range of 32–84.9° F., the "room temperature" LED is deactivated at step 208.

Figure 7B:
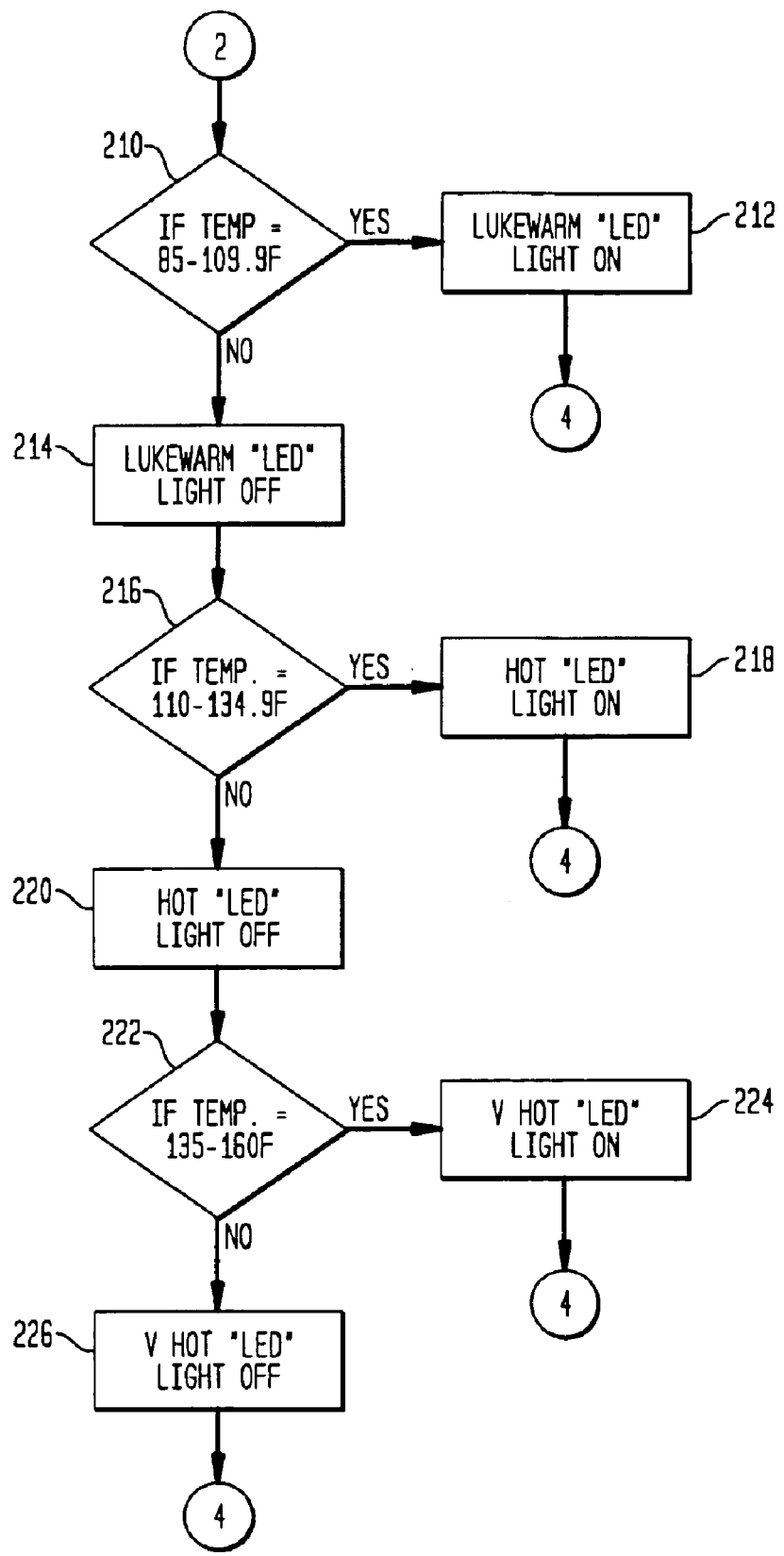

Referring to FIGS. 1, 2 and 7B, at step 210 the controller 46 determines whether the temperature is between 85–109° F. If the monitored temperature is within the range 85–109° F., the "lukewarm" LED 68C on LED panel 68 is illuminated at step 212. If the temperature is not within the range 85–109° F., the "lukewarm" LED is deactivated at step 214. At step 216, controller 48 monitors whether the measured temperature is within the range 110–134.9° F. If the measured temperature is within the range 110–134.9° F., the "hot" LED 68B on LED panel 68 is activated at step 218. If the measured temperature is not within the range 110–134.9° F., the "hot" LED 68B is deactivated at step 220.

At step 222, controller 46 measures and analyzes whether the temperature is within the range 135–160° F. If the measured temperature is within the range 135–160° F., the "very hot" LED 68A on LED panel 68 is activated at step 224. If the measured temperature is not within the range 135–160° F., the very hot LED 68A is deactivated at step 226.

Figure 7C:
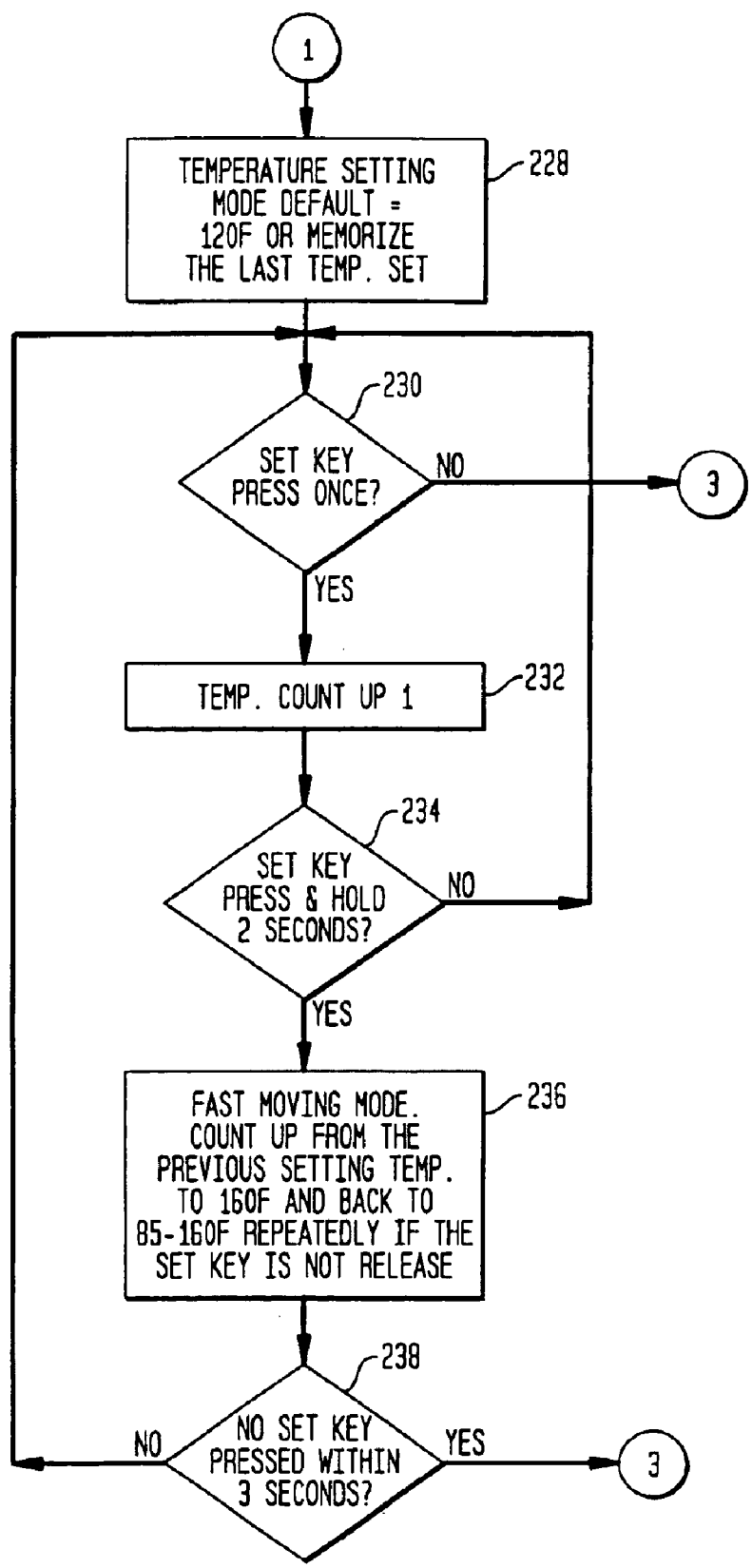

Referring to FIGS. 1–2 and 7C, if a user presses the set key 80 at step 202, the controller 46 enters into the temperature set mode at step 228. In the temperature set mode, controller 46 defaults to 120° F. as the final desired heating temperature for the liquid or memorizes the last temperature that was set by a user. Each time the set key 80 is pressed once (step 230), the final desired heating temperature rises by one degree (step 232). If the set key 80 is depressed and held in a depressed position for more than two seconds (step 234), the temperature setting mode transforms into a fast or rapid set mode at step 236. In the rapid set mode, the temperature count increases rapidly from the previously set temperature to 160° F. and then back to the 85–160° F. range until the set key 80 is released. Once the set key 80 is released for at least 3 seconds at step 238, the last temperature appearing on liquid crystal display 64 is considered to be the final desired heating temperature. Referring to step 234, if the set key is not depressed at step 234, the temperature appearing on the liquid crystal display 64 is the final desired heating temperature.

Figure 7D:
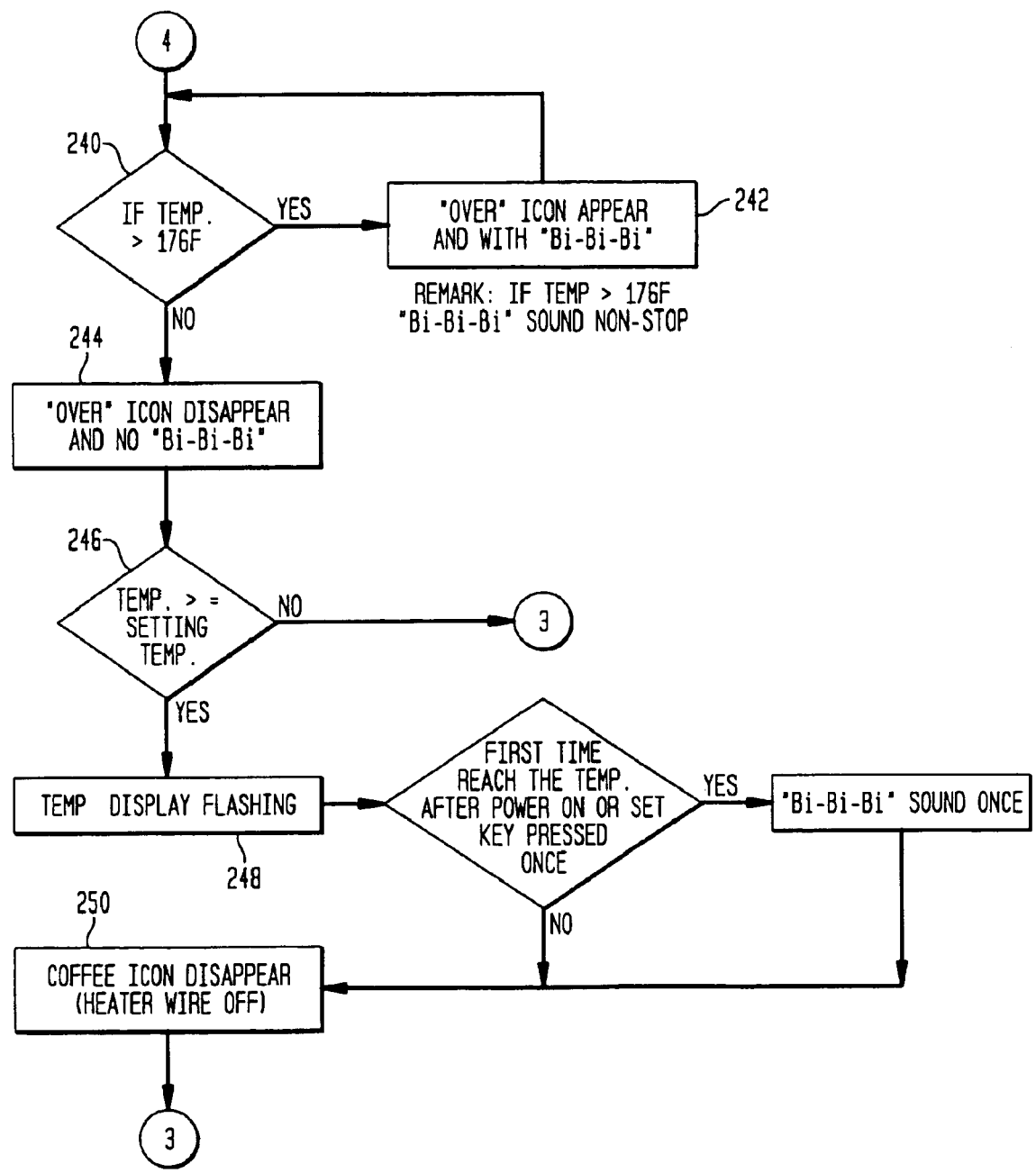

FIG. 7D shows a logic and flow chart for an over heating mode. Referring to FIGS. 1 and 7D, if the measured temperature exceeds 176° F. at step 240, an "over" icon 29 appears on LCD display 64 and the buzzer 84 is activated for generating a warning "Bi—Bi—Bi" sound. The buzzer is continuously activated so long as the measured temperature exceeds 176° F. If the temperature at step 240 is less than 176° F., the "over" icon 29 disappears and the buzzer 84 is deactivated at step 244. The heating element is preferably deactivated once the measured temperature is greater than or equal to 176° F., and remains deactivated until the measured temperature falls to below 176° F. or lower.

At step 246, when the measured temperature is greater than or equal to the set temperature selected by a user, the temperature display 25 flashes and the buzzer 84 is activated for generating a single "Bi" sound for indicating that the beverage is ready to drink. At step 250, the coffee icon 31 will disappear and the heater plate 32 is deactivated. If the measured temperature then drops 2° F. or more below the desired temperature, the heater plate 32 will be reactivated for reheating the liquid to the set temperature.

Figure 7E:
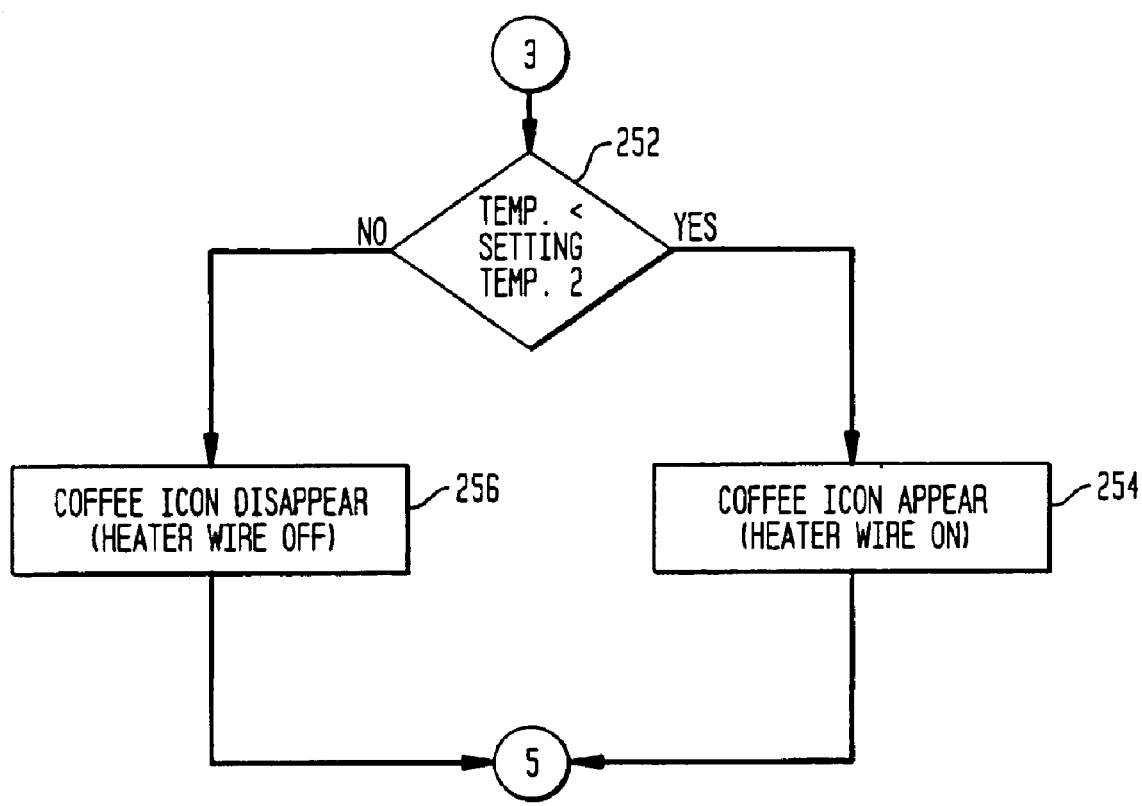

FIG. 7E shows a logic and flow chart routine for the controller 146 after the set or desired temperature has been initially attained. Referring to FIGS. 1 and 7E, at step 252, controller 46 compares the measured temperature to the set temperature and determines whether the measured temperature is within a temperature window of less than 2° F. below of the set temperature. If the monitored temperature has dropped by 2° F. or more below the set temperature, the heating coils 34 wrapped around heater plate 32 are reactivated by controller 46 and the coffee icon 31 appears on liquid crystal display 64. If the temperature measured by temperature sensor 62 is less than 2° F. below the set temperature, the coffee icon 31 disappears and heater plate 32 remains in a deactivated mode.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An electronic drinking mug comprising:
   said mug having an upper end and a lower end;
   a heating element in thermal communication with said mug for heating a liquid contained in said mug;
   a temperature sensor in communication with said heating element for monitoring a temperature of said liquid;
   a controller integrally attached to an outer surface of the mug and in communication with said heating element for selectively activating and deactivating said heating element so as to heat said liquid in said mug to a desired temperature, wherein said controller receives temperature signals from said temperature sensor and deactivates said heating element when the monitored temperature of said liquid is greater than or equal to the desired temperature of said liquid; and
   a user interface integrally attached to the outer surface of said mug and being in communication with said controller for establishing the desired temperature of said liquid, wherein said user interface is located closer to the upper end of said mug than the lower end of said mug.

2. The electronic drinking mug as claimed in claim 1, wherein said user interface includes a visual display in communication with said controller for displaying the monitored temperature or the established desired temperature of said liquid.

3. The electronic drinking mug as claimed in claim 2, wherein said visual display includes a liquid crystal display (LCD).

4. The electronic drinking mug as claimed in claim 2, wherein said visual display includes a LED panel having a series of light emitting diodes, each said light emitting diode being associated with liquid temperature levels selected from the group consisting of room temperature, lukewarm, hot, and very hot.

5. The electronic drinking mug as claimed in claim 1, further comprising a thermostat in communication with said heating element for regulating a temperature of said heating element.

6. The electronic drinking mug as claimed in claim 1, further comprising a sound generating element in signal receiving relation with said controller for selectively generating an audible sound.

7. The electronic drinking mug as claimed in claim 1, wherein said controller includes a logic subroutine that deactivates said heating element when the monitored temperature is greater than or equal to said desired temperature and reactivates said heating element when the monitored temperature falls at least 20° F. below the desired temperature.

8. The electronic drinking mug as claimed in claim 1, further comprising an electrical connector accessible at an exterior surface of said mug for providing electrical power to said controller and said heating element.

9. The electronic drinking mug as claimed in claim 1, wherein said controller has an overheat protection logic stored therein, wherein said controller deactivates said heating element when the monitored temperature is greater than a predetermined overheat temperature.

10. The electronic drinking mug as claimed in claim 9, wherein said controller activates a visual or audible indicator when the monitored temperature is greater than the predetermined overheat temperature.

11. The electronic drinking mug as claimed in claim 1, wherein said mug includes an outer mug, a removable inner mug insertable in said outer mug, and said heating element disposed between said outer and inner mugs.

12. The electronic drinking mug as claimed in claim 1, further comprising at least one temperature set key in signal sending relation with said controller.

13. The electronic drinking mug as claimed in claim 12, wherein said at least one temperature set key is depressible and wherein the selected temperature is elevated one degree each time said at least one set key is depressed and the selected temperature is elevated more rapidly when said at least one set key is depressed and maintained in the depressed position for more than a predetermined time period.

14. The electronic drinking mug as claimed in claim 13, wherein said temperature set key is depressible for activating said mug.

15. A method of maintaining a liquid at a selected temperature comprising:
    providing a drinking mug having an upper end, a lower end and a heating element in thermal communication with said mug;
    providing a temperature sensor in communication with said heating element for continuously monitoring a temperature of said liquid;
    integrally attaching a user interface to the outer surface of said mug at a location closer to the upper end of said mug than the lower end of said mug, wherein said user interface is in communication with a controller for establishing the desired temperature of said liquid;
    inserting a lower end of said mug into a cup holder so that the upper end of said mug including said user interface is located above the cup holder, wherein said user interface is visible and accessible above the cupholder;
    engaging said user interface for selecting the desired temperature for said liquid; and
    heating said liquid to said selected temperature.

16. The method as claimed in claim 15, further comprising deactivating said heating element after the heating step when said monitored temperature is greater than or equal to said desired temperature.

17. The method as claimed in claim 16, further comprising reactivating said heating element after the deactivating step when said monitored temperature is less than said desired temperature, and after the inserting step, engaging said user interface for reestablishing the desired temperature for said liquid.

18. The method as claimed in claim 15, further comprising generating a visual or audible signal when said monitored temperature is greater than or equal to said desired temperature.

19. The method as claimed in claim 15, further comprising providing a controller in communication with said heating element and said temperature sensor, wherein said controller has one or more logic subroutines stored therein for activating said heating element when the monitored temperature is less than the desired temperature and deactivating said heating element when the monitored temperature is greater than or equal to said desired temperature.

20. The method as claimed in claim 15, further comprising providing a series of light emitting diodes exposed at an exterior surface of said mug for indicating when the monitored temperature of said liquid is at a level associated with room temperature, lukewarm, hot, and very hot.

21. The method as claimed in claim 15, further comprising providing a visual display at the exterior surface of said mug for displaying the monitored temperature or the selected temperature.

22. An electronic drinking mug comprising:

said drinking mug including an outer mug and an inner mug insertable into said outer mug, said outer mug having an upper end, a lower end and a center midway between the upper and lower ends;

a heating element in communication with said inner mug for heating a liquid contained in said inner mug;

a temperature sensor in communication with said inner mug for monitoring a temperature of said liquid;

a controller being in communication with said heating element and said temperature sensor;

a user interface being integrally attached to said exterior surface of said outer mug and being in communication with said controller for establishing a desired temperature of said liquid, wherein said controller selectively activates and deactivates said heating element so as to heat said liquid in said inner mug to said desired temperature and wherein said controller is adapted to receive temperature signals from said temperature sensor and deactivate said heating element when the monitored temperature of said liquid is greater than or equal to said desired temperature of said liquid, wherein said user interface is located between the center and the upper end of said outer mug and is spaced from the lower end of said outer mug whereby when the lower end of said outer mug is placed in a cup holder, said user interface is visible and accessible above the cup holder.

23. The electronic drinking mug as claimed in claim 22, wherein said outer mug includes a recess and said controller and said user interface are secured to said recess.

24. The electronic drinking mug as claimed in claim 23, wherein recess includes a series of anchor points and said controller is secured to said anchor points by securing elements.

25. The electronic drinking mug as claimed in claim 22, wherein said user interface includes a series of light emitting diodes that are each activated by said controller at distinct temperature levels.

26. The electronic drinking mug as claimed in claim 25, wherein each one of said light emitting diodes is associated with one of said distinct temperature levels, and wherein only one of said light emitting diodes is illuminated at any one time.

27. The electronic drinking mug as claimed in claim 22, further comprising a handle secured to the exterior surface of said outer mug, said handle having a first section secured to said mug that extends substantially perpendicular to a longitudinal axis of said mug, said handle having a second section that extends from the first handle section, the second section extending downwardly toward the lower end of said mug, said second handle section having a free end spaced from the exterior surface of said outer mug.

28. The electronic drinking mug as claimed in claim 27, wherein the second section of said handle is curved.

29. The electronic drinking mug as claimed in claim 27, wherein the first section of said handle is substantially straight.

30. The electronic drinking mug as claimed in claim 22, further comprising an electrical connector provided at the exterior surface of said outer mug for providing electrical power to said controller and said heating element, said electrical connector being located approximately midway between the upper and lower ends of said outer mug.

31. The electronic drinking mug as claimed in claim 22, wherein the exterior surface of said outer mug tapers inwardly between the upper end and the lower end of said outer mug.

32. The electronic drinking mug as claimed in claim 22, wherein the exterior surface of said outer mug tapers inwardly along a substantially smooth line between the upper end and the lower end of said outer mug.

* * * * *

UNITED STATES PATENT AND TRADEMARK OFFICE
CERTIFICATE OF CORRECTION

PATENT NO. : 6,864,462 B2
DATED : March 8, 2005
INVENTOR(S) : Hughes Sanoner and Jacob Rothman It is certified that error appears in the above-identified patent and that said Letters Patent is hereby corrected as shown below:

Column 1,
Line 31, "Montal to" should read -- Montalto --

Column 3,
Line 4, "LED's" should read -- LEDs --
Line 49, "form of a male" should read -- form of male --

Column 5,
Line 15, "FIG. 5" should read -- FIG. 5. --
Line 51, "outer mug." should read -- outer mug 20. --

Column 9,
Line 53, "20ºF." should read -- 2ºF. --

Column 11,
Line 36, "wherein recess" should read -- wherein said recess --

Signed and Sealed this

Thirty-first Day of May, 2005

JON W. DUDAS
*Director of the United States Patent and Trademark Office*